(12) United States Patent
Flynn et al.

(10) Patent No.: US 6,481,223 B2
(45) Date of Patent: Nov. 19, 2002

(54) REFRIGERANT BLEND FREE OF R-22 FOR USE IN ULTRALOW TEMPERATURE REFRIGERATION

(75) Inventors: Kevin P. Flynn, Novato, CA (US); Mikhail Boiarski, Allentown, PA (US); Tamirisa V. V. R. Apparao, Fremont; Oleg Podtcherniaev, Novato, both of CA (US); Vladimir Mogorichny, Moscow Region (RU)

(73) Assignee: Intermagnetics General Corporation-Polycold Systems, Inc., San Rafael, CA (US)

( * ) Notice: Subject to any disclaimer, the term of this patent is extended or adjusted under 35 U.S.C. 154(b) by 0 days.

(21) Appl. No.: 09/728,501

(22) Filed: Nov. 30, 2000

(65) Prior Publication Data

US 2001/0042379 A1 Nov. 22, 2001

Related U.S. Application Data

(60) Provisional application No. 60/168,931, filed on Dec. 3, 1999.

(51) Int. Cl.[7] .................................................. F25B 1/10
(52) U.S. Cl. ....................................................... 62/114
(58) Field of Search ............................... 62/114; 252/67, 252/68

(56) References Cited

U.S. PATENT DOCUMENTS

| | | | | |
|---|---|---|---|---|
| 5,087,381 A | * | 2/1992 | Tamura et al. | 252/67 |
| 5,170,639 A | * | 12/1992 | Datta | 62/228.3 |
| 5,644,502 A | * | 7/1997 | Little | 364/496 |
| 5,702,632 A | * | 12/1997 | Weng | 252/67 |

* cited by examiner

*Primary Examiner*—Denise L. Esquivel
*Assistant Examiner*—Malik N. Drake
(74) *Attorney, Agent, or Firm*—Katten Muchin Zavis Roseman

(57) ABSTRACT

Refrigerants containing R-22 are replaced with new blends by using R-125, or R-125 with R-124, or R-218, or R-218 with R-124, in place of R-22. No hardware or oil composition changes are required to maintain temperatures, pressures and capacity substantially unchanged in a refrigeration system.

21 Claims, 3 Drawing Sheets

TABLE I

BLEND COMPOSITION IN MOLE FRACTION

|   |       | Overall Range (Blends A-D) | Blend A (PFC-1101 HC PFC-661 HC PFC-551 HC) | Blend B (PFC 331) | Blend C (PFC-1101 LT) | Blend D (PGC-151) |
|---|-------|---------------------------|---------------------------------------------|-------------------|-----------------------|-------------------|
| A | R-123 | 0.05-0.40 | 0.09-0.14 | 0.29-0.35 | 0.12 | 0.29 |
| F | R-124 | 0.0-0.20  | 0.06-0.13 | 0.0       | 0.08 | 0.0  |
| G | R-125 | 0.0-0.20  | 0.1-0.16  | 0.10      | 0.0  | 0.10 |
| H | R-218 | 0.0-0.15  | 0.0       | 0.0       | 0.09 | 0.0  |
| B | R-23  | 0.0-0.35  | 0.09-0.14 | 0.11      | 0.0  | 0.31 |
| C | R-14  | 0.15-0.30 | 0.25-0.29 | 0.17      | 0.25 | 0.22 |
| E | Argon | 0.0-0.30  | 0.09-0.15 | 0.16      | 0.26 | 0.08 |

FIGURE 1

TABLE II
PERFORMANCE PROVIDED BY TWO NEW BLENDS WITHOUT R-22 COMPARED WITH PRIOR BLENDS CONTAINING R-22

| Parameter (Evaporator Thermal Load) | Blend* containing R-22 PFC-1100 HC | | Blend A PFC-1101 HC | | Blend** containing R-22 PFC-1100 LT | | Blend C PFC-1101 LT | |
|---|---|---|---|---|---|---|---|---|
| | Minimum Load (90 Watts) | Maximum Load (3600 Watts) | Minimum Load (90 Watts) | Maximum Load (3600 Watts) | Minimum Load (90 Watts) | Maximum Load (800 Watts) | Minimum Load (90 Watts) | Maximum Load (800 Watts) |
| Evaporator Inlet Temp., C | -134 | -108 | -134 | -108 | -152 | -150 | -156 | -150 |
| Evaporator Outlet Temp., C | -128 | -97 | -133 | -92 | -151 | -139 | -155 | -139 |
| Compressor Discharge Temp., C | 105 | 127 | 97 | 118 | 116 | 122 | 109 | 120 |
| Liquid Line Temp., C | 24 | 27 | 26 | 26 | 26...28 | 26...28 | 27 | 27 |
| Compressor Suction Temp., C | -4 | 7 | 7 | 13 | 1 | 2 | 5 | 9 |
| Compressor Current, A | 25 | 49 | 30 | 50 | x | x | 14 | 16 |
| Discharge Pressure, psig | 161 | 350 | 200 | 365 | 189 | 250 | 209 | 265 |
| Suction Pressure, psig | 15 | 44 | 22 | 44 | 22 | 31 | 18 | 25 |
| Voltage, V | 230 | 230 | 230 | 230 | 460 | 460 | 460 | 460 |

\* R-123, R-22, R-23, R-170, R-14, Argon
\*\* R-123, R-22, R-170, R-14, Argon

FIGURE 2

REFRIGERANT BLEND FREE OF R-22 FOR USE IN ULTRALOW TEMPERATURE REFRIGERATION

This application claims the benefit of prior filed and pending provisional Application No. 60/168,931 filed Dec. 3, 1999.

BACKGROUND OF THE INVENTION

The refrigerants referenced herein will soon be illegal in Europe because they contain R-22. However, they will be legal in the rest of the world until 2020. In addition, European law requires disclosure of refrigerant composition. Previously composition was kept as a trade secret for manufacturers blends containing R-22. However, if the focus is on identifying R-125 and R-218 as replacements for R-22, this invention will be applicable for the foreseeable future.

SUMMARY OF THE INVENTION

It is an object of the invention to develop a refrigerant blend, which is free of R-22 and which can be used to provide the same refrigeration performance as the previous blend without requiring changes in the compressor, compressor oil, refrigerant liquid-vapor phase separators, or to the heat exchanger arrangement.

Elimination of R-22 was required by German law. However, there is not a pure R-22 substitute, which would provide identical refrigeration performance, a low freezing point temperature, and good miscibility with mineral oil and alkylbenzene oil. Achieving the same performance without R-22 typically requires changes in compressor oil and changes to system components such as expansion devices.

A new charge has been developed that does not require different oil, a different compressor, or changes to the expansion devices, heat exchangers or phase separator. The arrangement was not obvious and required significant development and experimental efforts. Two strategies were considered to substitute R-22. The first one was based on the use of R-125 combined with R-123 and R-124. The second strategy was based on R-218 combined with R-123 and R-124. The pure refrigerant R-125 has a higher freezing point temperature compared to R-218. But R-125 is more soluble with other components like R-23, R-124 and R-123. This characteristic helps to reduce freezing temperatures of the blend at low temperature in the system.

For both strategies a proper proportion between R-124 and R-123 is important. This proportion is a tradeoff between a higher refrigeration capacity for R-123, a lower freezing temperature for R-124, and better oil management provided by R-124 downstream of the first phase separator by virtue of R-124's higher vapor pressure.

Development was completed of new systems with the above refrigerants. The new charges maintain similar operating compressor temperatures and pressures. Temperatures provided are within 4 C of the old rated performance for all models. Representative data of the systems with the R-22 containing mixture and the R-22 free mixture are shown in Table II. The blend development was done on auto-refrigerating cascade systems (Missimer U.S. Pat. No. 3,768,273). This cycle is a modified configuration of the Klimenko cycle (A. P. Klimenko "One-flow cascade cycle", IIR Int'l Congress of Refrig./Copenhagen, Denmark, 1959). However, testing was done on a single expansion device system similar to a U.S. Pat. No. 5,44,658 type system. Therefore, the novel blends could be employed in a U.S. Pat. No. 5,441,658 system. It is anticipated that these mixtures are applicable to any configuration of the Klimenko cycle as well.

Refrigerant blends having the following compositions are for use in a closed loop vapor compression refrigeration cycle. The cycle is selected to achieve refrigeration in the temperature range of −70 C to −165 C, based on a single-stage compressor. The blends replace R-22 by using R-125, or R-125 with R-124, or R-218, or R-218 with R-124. Relative to the R-22 blend, the flammability of the replacement blend is the same or less. These replacement blends were developed for use with compressor oils traditionally used with R-22 such as mineral oil or alkyl benzene oil.

The individual developed blends in accordance with the invention are shown in Table I (FIG. 1) and indicated as Blend A, Blend B, etc. Also shown in the table are the model numbers of developed commercial products (IGC Polycold Systems, Inc., San Rafael, Calif.), which use these blends.

For example, a prior art refrigeration unit, used a mixture, containing R-123, R-22, R-23, R-170, R-14, and argon. This mixture has been successfully replaced with Blend B (Table I) to achieve the goal of providing equivalent refrigerant performance without using R-22.

Further, in accordance with the invention, another component may be added to the above compositions provided that the ratios of the listed components (Table I) remain in the same proportions relative to each other. Also, it is recognized that R-218 and R-125, which have been used exclusively, can also be combined in the same blend.

Weng, in U.S. Pat. No. 5,408,848, describes a CFC free blend which uses HCFC's. The Weng inventors note the difficulty in maintaining acceptable discharge temperatures when using their blend. Hardware modifications were required to make their blend work in prior equipment. The present invention enables the same performance to be provided without making hardware modifications as described by the Weng Patent.

Accordingly, an object of the invention was development of improved refrigerant blends which are free of R-22 and which can be used to provide the same refrigeration performance as a previous blend with R-22 without requiring changes in the compressor, compressor oil, refrigerant liquid-vapor phase separators, and heat exchanger arrangement.

The invention accordingly comprises blends of refrigerants possessing the characteristics, properties and the relation of components which are exemplified in the blends herein-after described, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is Table I of refrigerant blend compositions in accordance with the invention;

FIG. 2 is Table II of comparative refrigeration system performance using refrigerant blends in accordance with the invention.

DESCRIPTION OF PREFERRED EMBODIMENTS

Figure 3:
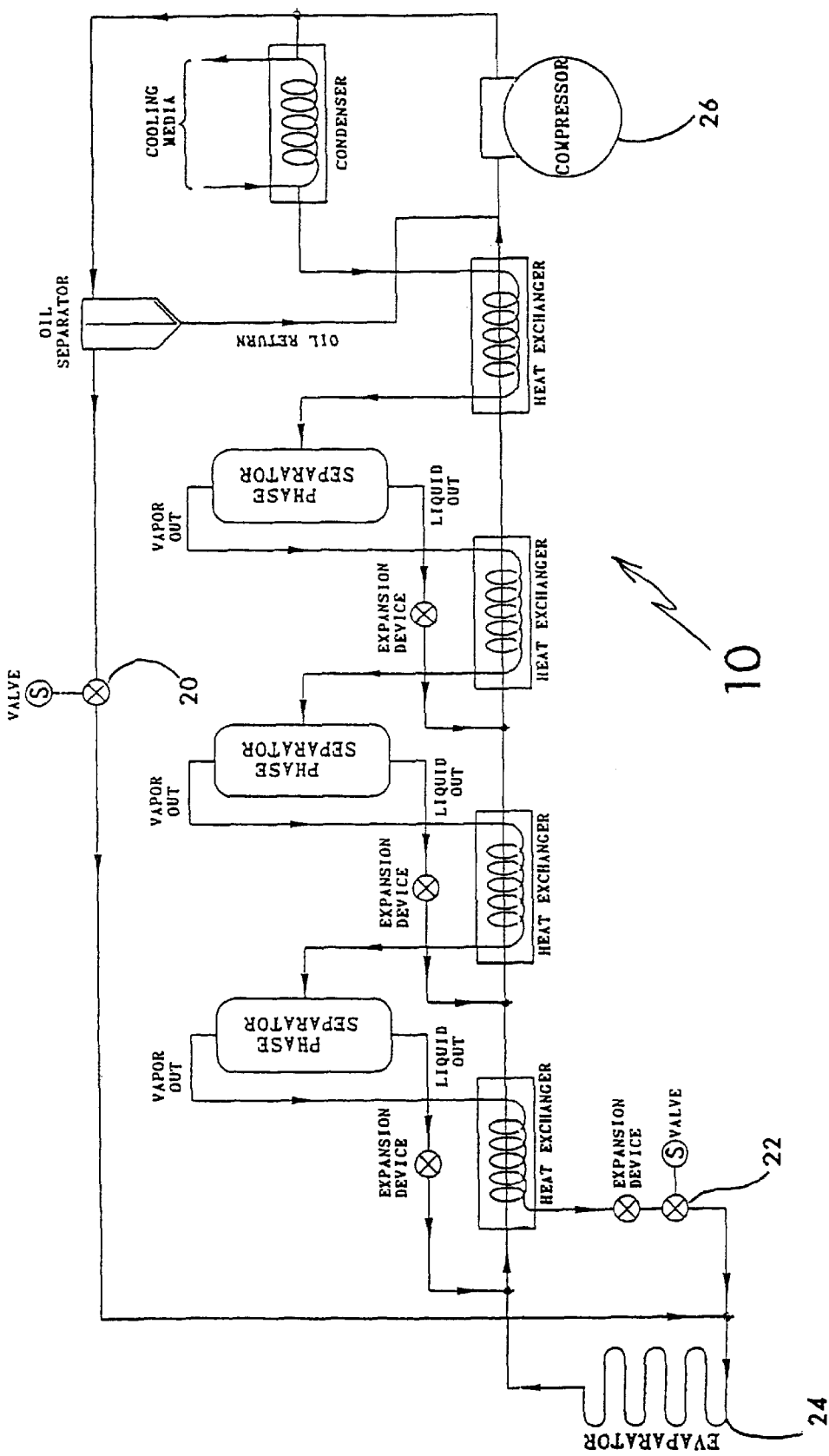
FIG. 3 is a schematic of a refrigeration system, an autorefrigerating cascade, operable without modification using a refrigerant blend in accordance with the invention.

Previous blends included R-123, R-22, R-23, R-14 and argon. In other blends R-170 was used with or instead of R-23. The new blends of the present invention replace R-22 and instead include R-125, or use R-125 with R-124, as a replacement or use R-218 to replace R-22, or use R-218 with R-124 as a replacement for R-22. Each blend must have one of these refrigerants to replace the prior use of R-22.

The refrigeration effects provided by the systems that use alternatively the old blends containing R-22 and the new blends described herein have many different uses. The systems can be used, for example, to provide water vapor cryopumping of gasses to increase product yield during physical vapor deposition processes. Similarly, these refrigeration systems can be used for freeze drying processes by removing water from the food products via water vapor cryopumping. The systems can also be used to cool a secondary liquid or gas, or to liquify a secondary gas or gas mixture.

The refrigeration systems can also be used to cool objects, in which constructions the refrigerant flows through channels in a material (heat sink), typically metal, which then conducts heat away from the item (load) to be cooled. Examples include the cooling platens used when processing silicon wafers, cooling glass or plastic plates for flat panel displays, and cooling aluminum discs used in the manufacture of hard drives. The systems can also be used to freeze and store biological samples at very low temperature for long term preservation.

In addition to the basic refrigeration performance, any refrigeration system must be able to operate during start-up modes. Many mixed refrigerant models exist to predict refrigeration performance for any given mixture. However, developing a working system of actual hardware and controls requires that modeled mixtures, which may be obvious-to-try, be screened for various transients such as start-up, which is always very difficult to model with any significant confidence.

In addition, some systems require rapid defrost of a tube or thermal interface that is being cooled. Operating conditions during and after defrost present a performance transient that is even more difficult to predict. Some prior art systems containing R-22 provided a defrost function. The new replacement blends in accordance with the invention provide the same quick defrost capability. An arrangement that provided quick defrost is shown in FIG. 3. In this construction two valves 20, 22 were used to select whether cold refrigerant or hot compressor gas is directed to the customer's evaporator 24. When hot gas is selected by opening valve 20, and closing valve 22, the evaporator is typically warmed until the return gas temperature to the refrigeration system 10 reaches +20 C. At this time a standby period follows with both valves 20, 22 closed, without either cold refrigerant or hot gas flowing to the evaporator. However, the compressor 26 continues to operate and the autorefrigeration system 10 continues to provide flow paths for refrigerant to refrigerate itself. For cooling the evaporator 24, valve 20 is closed and valve 22 is open.

Four different basic blends are shown in Table I (FIG. 1). It is expected that the ranges of compositions shown in Table I are applicable to the many different refrigeration cycles as mentioned. Blends A through D are examples of blends that were actually developed in autorefrigerating cascades in evaluating the present invention. Each one is a variant based on particular requirements of the refrigeration unit for which it was developed. An overall blend composition encompassing Blends A–D is shown at the left column in Table I to identify ranges of compositions that fall within the scope of this invention. Within these ranges the number of compositions and their performances are potentially infinite. Those skilled in the art will understand how to adjust the blend composition to optimize performance for each specific hardware arrangement.

Blends were implemented in three different commercially available refrigeration systems with minor modifications as disclosed in the Missimer patent. Variations between the different systems are a result of slight differences in the performance specifications for each unit. Table II (FIG. 2) gives important system operating conditions when a refrigeration system was operated alternatively with the prior blend that contained R-22 and then with Blend A. As evident from the data, performance is closely matched between the two blends. Another example wherein Blend C is a substitute refrigerant, is also included in Table II.

The provisional Application No. 60,168,931, cited above, is incorporated herein, in its entirety, by reference.

It will thus been seen that the objects set forth above, among those made apparent from the preceding description, are efficiently attained, and since certain changes may be made in the above refrigerant blends without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which might be said to fall therebetween.

What is claimed is:

1. Refrigerant blends not containing R-22 for use in a refrigeration system, said refrigerant blends comprising:

| Component | Range in mol fraction |
|---|---|
| A | 0.01 to 0.45 |
| B | 0.00 to 0.40 |
| C | 0.00 to 0.30 |
| D | 0.10 to 0.35 |
| E | 0.00 to 0.35 |
| F | 0.00 to 0.25 |
| G | 0.00 to 0.25 | where A is R-123; B is R-23; C is R-170; D is R-14; E is Argon; F is R-124; G is R-125 and is greater than 0.

2. A refrigerant blend of claim 1, selected from the group consisting of Blend 1, Blend 2, Blend 3 and Blend 4, where each blend has the composition as follows, with the proportions specified in respective mol fractions:

| | Blend 1 | Blend 2 | Blend 3 | Blend 4 |
|---|---|---|---|---|
| A | 0.09–0.14 | 0.29–0.35 | 0.12 | 0.29 |
| B | 0.09–0.14 | 0.11 | 0.00 | 0.31 |
| C | 0.11–0.14 | 0.11 | 0.20 | 0.00 |
| D | 0.25–0.29 | 0.17 | 0.25 | 0.22 |
| E | 0.09–0.15 | 0.16 | 0.26 | 0.08 |
| F | 0.06–0.13 | 0.00 | 0.08 | 0.00 |
| G | 0.10–0.16 | 0.10 | 0.09 | 0.10. |

3. Refrigerant blends as in claim 2 and further comprising at least one additional component in each said blend, the components A–G maintaining the same proportions relative to each other after addition of said additional component.

4. Refrigerant blends as in claim 2, wherein said refrigeration system is a single compressor cycle in one of an autorefrigerating cascade, a single expansion device refrigeration system, and a Klimenko type system.

5. Refrigerant blends as in claim 4, said blends excluding R-218 are used to achieve refrigerating temperatures between −60 c and −163 c.

6. Refrigerant blends as in claim 4 wherein said refrigerating system alternatively permits flow of cold refrigerant or flow of hot refrigerant to an evaporator.

7. Refrigerant blends not containing R-22 as in claim 2, said blends operating as a replacement in a refrigeration system to provide substantially the same thermodynamic performance in said system as provided by earlier blends of components A, B, C, D, E, R-22, in said earlier blends components A–E being respectively equal to or greater than 0 mol percent and R-22 being greater than 0 mol percent.

8. A refrigeration system utilizing a refrigerant blend as in claim 2, wherein said refrigeration system includes an object being cooled by the refrigerant, said object being at least one of
   (a) a metal tube in a vacuum chamber freezing out and trapping undesired gasses such as water vapor,
   (b) a heat exchanger removing heat from a secondary fluid stream including at least one of a liquid, gas, condensing gas, and condensing gas mixture,
   (c) a metal element having internal refrigerant flow passages and cooling at least one of a silicon wafer, piece of glass, plastic piece and an aluminum disc with or without a magnetic coating on it, and
   (d) a biological freezer to at least one of freeze and store biological tissues.

9. Refrigerant blends not containing R-22 as in claim 1, said blends operating as a replacement in a refrigeration system to provide substantially the same thermodynamic performance in said system as provided by earlier blends of components A, B, C, D, E, R-22, in said earlier blends components A–E being respectively equal to or greater than 0 mol percent and R-22 being greater than 0 mol percent.

10. A refrigeration system utilizing a refrigerant blend as in claim 1, wherein said refrigeration system includes an object being cooled by the refrigerant, said object being at least one of
   (a) a metal tube in a vacuum chamber freezing out and trapping undesired gasses such as water vapor,
   (b) a heat exchanger removing heat from a secondary fluid stream including at least one of a liquid, gas, condensing gas, and condensing gas mixture,
   (c) a metal element having internal refrigerant flow passages and cooling at least one of a silicon wafer, piece of glass, plastic piece and an aluminum disc with or without a magnetic coating on it, and
   (d) a biological freezer to at least one of freeze and store biological tissues.

11. A refrigerant blend of claim 1, selected from the group consisting of Blend 5, Blend 6, Blend 7 and Blend 8, where each blend has the composition as follows, with the proportions specified in respective mol fractions:

|   | Blend 5 | Blend 6 | Blend 7 | Blend 8 |
|---|---------|---------|---------|---------|
| A | 0.09–0.14 | 0.29–0.35 | 0.12 | 0.29 |
| B | 0.09–0.14 | 0.11 | 0.00 | 0.31 |
| C | 0.11–0.14 | 0.11 | 0.20 | 0.0 |
| D | 0.25–0.29 | 0.17 | 0.25 | 0.22 |
| E | 0.09–0.15 | 0.16 | 0.26 | 0.08 |
| F | 0.06–0.13 | 0.00 | 0.08 | 0.00 |
| G | 0.10–0.16 | 0.10 | 0.09 | 0.10. |

12. Refrigerant blends as in claim 11 and further comprising at least one additional component in each said blend, the components A–F and H maintaining the same proportions relative to each other after addition of said additional component.

13. Refrigerant blends as in claim 11, wherein said refrigeration system is a single compressor cycle in one of an autorefrigerating cascade, a single expansion device refrigeration system, and a Klimenko type system.

14. Refrigerant blends as in claim 13, wherein said blends including R-218 are used to achieve refrigerating temperatures between −60 c and −183 c.

15. Refrigerant blends as in claim 13 wherein said refrigerating system alternatively permits flow of cold refrigerant or flow of hot refrigerant to an evaporator.

16. A refrigeration system utilizing a refrigerant blend not containing R-22 as in claim 11, said blend operating as a replacement in a refrigeration system to provide substantially the same thermodynamic performance in said system as provided by earlier blends of components A, B, C, D, E, R-22, in said earlier blends components A–E being respectively equal to or greater than 0 mol percent and R-22 being greater than 0 mol percent.

17. A refrigeration system utilizing a refrigerant blend as in claim 11, wherein said refrigeration system includes an object being cooled by the refrigerant, said object being at least one of
   (a) a metal tube in a vacuum chamber freezing out and trapping undesired gasses such as water vapor,
   (b) a heat exchanger removing heat from a secondary fluid stream including at least one of a liquid, gas, condensing gas, and condensing gas mixture
   (c) a metal element having internal refrigerant flow passages and cooling at least one of a silicon wafer, piece of glass, plastic piece and an aluminum disc with or without a magnetic coating on it, and
   (d) a biological freezer to at least one of freeze and store biological tissues.

18. Refrigerant blends not containing R-22, for use in a refrigeration system, said refrigerant blends comprising:

| Component | Range in mol fraction |
|-----------|----------------------|
| A | 0.01 to 0.45 |
| B | 0.00 to 0.40 |
| C | 0.00 to 0.30 |
| D | 0.10 to 0.35 |
| E | 0.00 to 0.35 |
| F | 0.00 to 0.25 |
| H | 0.00 to 0.20 | where A is R-123; B is R-23; C is R-170; D is R-14; E is Argon; F is R-124; H is R-218 and is greater than 0.

19. Refrigerant blends not containing R-22 as in claim 2, said blends operating as a replacement in a refrigeration system to provide substantially the same thermodynamic performance in said system as provided by earlier blends of components A, B, C, D, E, R-22, in said earlier blends components A–E being respectively equal to or greater than 0 mol percent and R-22 being greater than 0 mol percent.

20. A refrigeration system utilizing a refrigerant blend as in claim 2, wherein said refrigeration system includes an object being cooled by the refrigerant, said object being at least one of
   (a) a metal tube in a vacuum chamber freezing out and trapping undesired gasses such as water vapor,
   (b) a heat exchanger removing heat from a secondary fluid stream including at least one of a liquid, gas, condensing gas, and condensing gas mixture,
   (c) a metal element having internal refrigerant flow passages and cooling at least one of a silicon wafer, piece of glass, plastic piece, and an aluminum disc with or without a magnetic coating on it, and
   (d) a biological freezer to at least one of freeze and store biological tissues.

21. A refrigerant blend free of R-22 and replacing R-22 in refrigeration cycles where R-22 has been conventionally used, comprising R-218 and at least four components taken from the group consisting of R-123, R-124, R-23, R-170, R-14 and Argon.

* * * * *